United States Patent [19]

Whitney et al.

[11] 4,104,450
[45] Aug. 1, 1978

[54] ALKALI METAL BATTERIES HAVING ELECTROLYTES INCLUDING ALKALI METAL SALTS OF COMPLEX ANIONS CONTAINING HETEROATOM SUBSTITUENTS IN ORGANIC SOLVENT

[75] Inventors: Thomas A. Whitney, Roselle; Lawrence P. Klemann, Somerville, both of N.J.

[73] Assignee: Exxon Research & Engineering Co., Linden, N.J.

[21] Appl. No.: 827,133

[22] Filed: Aug. 24, 1977

[51] Int. Cl.² ............................................. H01M 6/14
[52] U.S. Cl. .................................. 429/194; 429/198; 429/218
[58] Field of Search ................ 429/194, 197, 198, 218

[56] References Cited

U.S. PATENT DOCUMENTS 3,764,385  10/1973  Langer, Jr. et al. ................. 429/105

Primary Examiner—Charles F. LeFevour
Attorney, Agent, or Firm—Kenneth P. Glynn

[57] ABSTRACT

An electrochemical cell is described which has an alkali metal anode, a cathode and a non-aqueous electrolyte which includes:

(a) an organic solvent selected from the group consisting of inertly substituted and unsubstituted ethers, esters, sulfones, organic sulfites, organic sulfates, organic nitrites and organic nitro compounds; and, (b) electrolytically active alkali metal salts including alkali metal complex anion salts having the formula:

$$ZMR_xQ_y$$

wherein Z is an alkali metal, M is a metal selected from the group consisting of Zn, Cd, B, Al, Ga, In, Tl, Sn (stannous), P and As, the Rs are certain organic radicals, the Qs are certain heteroatom substituents, $x$ is zero or a positive integer, and $y$ is a positive integer, subject to the proviso that the sum of $x$ plus $y$ is equal to one plus the valence of the metal M. Preferred are the cells having an alkali metal anode, a transition metal chalcogenide active cathode, and an electrolyte as described.

64 Claims, No Drawings

ALKALI METAL BATTERIES HAVING ELECTROLYTES INCLUDING ALKALI METAL SALTS OF COMPLEX ANIONS CONTAINING HETEROATOM SUBSTITUENTS IN ORGANIC SOLVENT

BACKGROUND OF THE INVENTION

1. Field of the Invention

The present invention relates to novel high energy density electrochemical cells and more particularly to novel rechargeable, high energy density electrochemical cells having alkali metal anodes and containing electrolytes which include organic solvent and alkali metal salts of complex anions containing heteroatom substituents.

2. Prior Art

A recently developed rechargeable, high energy density electrochemical cell consists of an alkali metal material as the anode-active material, a transition metal chalcogenide as the cathode-active material, and a nonaqueous electrolyte. More specifically, preferred cells consist of lithium anodes, titanium disulfide cathodes and nonaqueous electrolyte compositions consisting of various lithium salts, such as $LiClO_4$, dissolved in organic solvents, such as propylene carbonate, tetrahydrofuran, dioxolane, and mixtures of dimethoxyethane and tetrahydrofuran, and containing various stabilizing additives.

Important features of these cells include their ability to be repeatedly discharged and charged. Theoretically, cycling by discharging and charging should be possible indefinitely, but in practice indefinite cycling is not realized. Dendritic growth on the anode during charging and degradation of the cathode material are sometimes limiting factors in the amount of cycling to which a cell can be subjected. However, the electrolyte, particularly nonaqueous electrolytes, can at times be the limiting factor. The effects of a particular electrolyte composition on the electrochemical performance of a cell may be significant due to its relative stability or it may be due to other factors. One particular electrolyte composition might be highly effective with a given anode-cathode couple but be ineffective for another couple, either because it is not inert to the second couple or because it reacts with itself under the conditions present during cycling. Furthermore, even when a particular electrolyte composition is effective in a given cell, it may nonetheless be undesirable for other reasons. For example, the sometimes preferred $LiClO_4$ based electrolyte creates a potential explosion hazard.

It is believed that the advantageous electrolytes used in the cells of the present invention have not been heretofore made or discovered and that no electrolytes existed heretofore which would render the cells of the present invention containing these electrolytes obvious. U.S. Pat. No. 3,904,692 (Lassau et al) describes various compounds as catalysts for dehydrogenation of secondary alcohols and among those included in the generic expression disclosed therein are $LiAlH(CH_3)_2[N(CH_3)_2]$ and $LiAlH(C_2H_5)_2[N(CH_3)_2]$. However, these compounds contain hydrogen as one of the metal substituents and are therefore not similar to the salts used in the electrolytes of the cells of the present invention which contain no hydrogen substituents. Also, Smith et al, J. Am. Chem. Soc., Vol. 73, June 1951, p 2751 et seq., describe compounds such as $NaB(CH_3)_3[NH_2]$ and $LiB(CH_3)_3[N(H)C_2H_5]$. However, these compounds of Smith et al have hydrogen substituents on the nitrogen atom, i.e., the compounds contain primary amide (primary ammonobase) substituents, whereas the salts of the electrolytes used in the cells of the present invention contain no hydrogen substituents on the nitrogen atom, i.e. the present invention cell electrolyte salts contain secondary amine (secondary ammonobase) substituents. Additionally, the Smith et al compound of the formula $LiB(CH_3)_3[N(H)C_2H_5]$, believed to be closest to the salts used in the present invention, was found to be unstable and decomposed on standing at $-33°$ C. U.S. Pat. No. 3,734,963, now Reissue No. 28,456 (Langer et al) describes various alkali metal organometallic compounds which are chelated with certain bifunctional complexing agents. However, neither the organometallic compounds per se nor the chelate complexes of the Langer et al patent contain those heteroatom substituents of the salts used in the present invention. Recent studies have been made directed to $LiB(C_6H_5)_4$ electrolyte systems by Szwarc et al, J. Phy. Chem., Vol. 69, p 608 et seq. (1965), but these systems have been found to have low solubility and high resistivity.

U.S. Pat. No. 3,764,385 (Langer et al) describes alkali metal organometallic compounds which are complexed with certain complexing agents having bifunctionality, and the resulting chelate complexes are described as useful electrolytes for primary and secondary batteries. However, the patent does not teach compounds such as those used in the present invention having the claimed heteroatom substituents. In view of the differences between the novel salts used in the present invention and the compounds and complexes of Langer et al, it is believed that the Langer et al patent does not teach or render obvious the electrolyte compositions of the present invention. U.S. Pat. No. 4,060,674 formerly copending U.S. application Ser. No. 750,517, filed on Dec. 14, 1976, describes the use of various alkali metal organometallic compounds, e.g. $LiB(CH_3)_4$, as useful electrolyte components in organic solvents, but again such compounds are different from those used in the present invention in that they do not contain the presently claimed heteroatom substituents.

For these reasons, novel but effective lithium salt-containing electrolyte composition-containing alkali metal anode type cells are desirable.

DESCRIPTION OF THE INVENTION

The present invention is directed to improved electrochemical cells containing alkali metal anodes, cathodes and electrolyte compositions which include:

(a) organic solvents selected from the group consisting of inertly substituted and unsubstituted ethers, esters, sulfones, organic sulfites, organic sulfates, organic nitrites and organic nitro compounds; and, (b) electrolytically active alkali metal salts including alkali metal complex anion salts having the following formula:

$$ZMR_xQ_y \qquad (1)$$

wherein Z is an alkali metal, M is a metal selected from the group consisting of Zn, Cd, B, Al, Ga, In, Tl, Sn (stannous), P and As, the Rs are inertly substituted and unsubstituted organic radicals, the Qs are heteroatom substituents more specifically described below, x is zero or a positive integer, and y is a positive integer, subject to the proviso that the sum of x plus y is equal to one plus the valence of the metal M.

The alkali metal represented by Z in Formula (1) above is any alkali metal, but is desirably selected from lithium and sodium, with lithium being the preferred embodiment.

The metal M in Formula (1) is any of zinc, cadmium, boron, aluminum, gallium, indium, thallium, tin (stannous), phosphorus and arsenic. Desirably, M is selected from the group consisting of boron, aluminum, phosphorus and arsenic. Most preferred is boron.

The variable R in Formula (1) above occurs $x$ number of times and each R may be the same or different from the other Rs in a given formula. As mentioned, the Rs in general represent inertly substituted and unsubstituted organic radicals. By "inertly substituted" is meant radicals containing substituents which have no detrimental effect on the formation or stability of the compounds and do not otherwise negate the utility of the compounds. Thus, the organic radicals R may be inertly substituted and unsubstituted alkyl radicals, aryl radicals, alkaryl radicals and aralkyl radicals. Of these, the unsubstituted radicals are preferred. The organic radicals R may be selected from the group consisting of alkyl radicals having 1 to 20 carbon atoms, aryl radicals having 6 to 18 carbon atoms, and alkaryl and aralkyl radicals having 7 to 25 carbon atoms, and naphthenic radicals having 3 to 10 carbon atoms. Desirable organic radicals are the alkyl radicals having 1 to 6 carbon atoms and the aryl radicals having 6 to 10 carbon atoms. Particularly useful are the compounds wherein R represents methyl and/or ethyl radicals.

The variable Q represents heteroatom substituents and occurs a sufficient number of times to render a total valence of $y$ in the compounds of the present invention. In general, Q may represent one or more heteroatom substituents selected from the group consisting of:

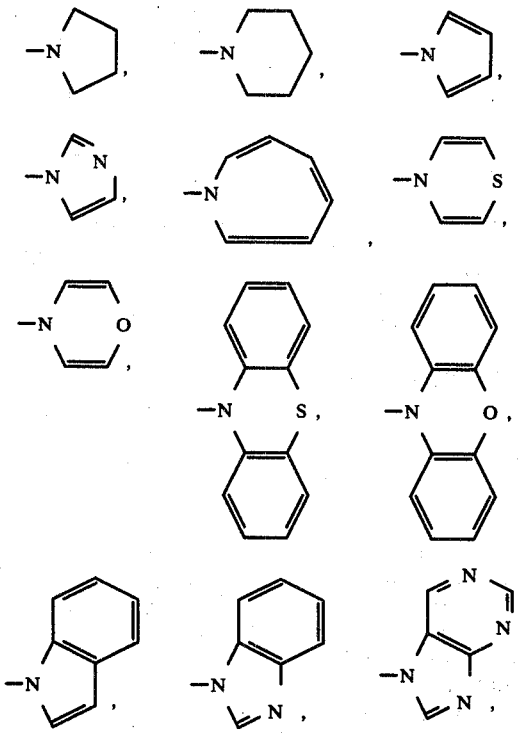

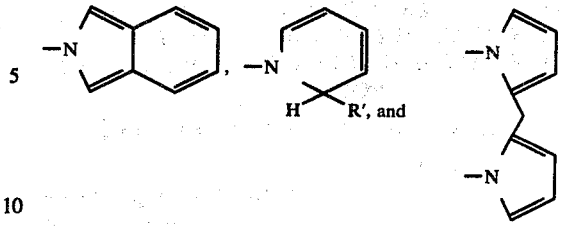

and any dimeric or trimeric composite of the foregoing radicals, and any group composed of two or three of the above structural units linked directly or through additional carbon (methylene);

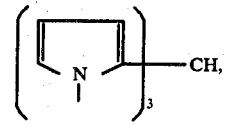

—NR'R',    —PR'R',    —AsR'R',    —SiR'R'R', —GeR'R'R',    —SnR'R'R', chelating dianions of the formulas

R'R'GeR"GeR'R', and R'R'SnR"SnR'R', chelating trianions of the formulas R'NR"NR"NR', R'PR"PR"PR', R'AsR"AsR"AsR', R'R'SiR"Si(R')R"SiR'R', R'R'GeR"Ge(R')R"GeR'R', and R'R'SnR"Sn(R')R"SnR'R', and the chelating tetraanions, the chelating pentaanions and the chelating hexaanions corresponding to the foregoing N, P, As, Si, Ge and Sn trianion formulas, wherein each of the R's are the same or different and are selected from the group consisting of unsubstituted and inertly substituted organic radicals consisting of alkyl radicals having 1 to 20 carbon atoms, aryl radicals having 6 to 18 carbon atoms, aralkyl and alkaryl radicals having 7 to 25 carbon atoms and naphthenic radicals having 3 to 10 carbon atoms, and wherein each of the R"s are the same or different and are selected from the group consisting of (1) hexa- and penta- cycloaliphatic and aromatic radicals and their lower alkyl derivatives wherein said radicals are attached in the above Q heteroatom substituents at 1,2- or 1,3- positions on the cycloaliphatic rings and at the 1,2- positions on the aromatic rings, and (2) 2 and 3 methylenic radicals, wherein each methylenic radical contains 0 to 2 monovalent hydrocarbon radicals of 1 to 6 carbon atoms. Desirable are the foregoing heteroatom substituents wherein the R' radicals are unsubstituted. Also desirable are the R' alkyl radicals having 1 to 6 carbon atoms and the aryl radicals having 6 to 10 carbon atoms. Particularly useful are the compounds wherein the R'are methyl and/or ethyl radicals. Of all of the heteroatom substituents above, the cyclic substituents are preferred.

As mentioned, the variable $x$ in Formula (1) above is zero or a positive integer, $y$ is a positive and the sum of $x$ plus $y$ is equal to one plus the valence of the metal M. Also, as mentioned, $x$ represents the number or organic radicals R which occur in the compounds of the present invention, whereas $y$ represents the total valence of the heteroatom substituents Q which are present in the compound. When all of the Qs in the formula are the preferred monoanion substituents, the total valence $y$ also equals the total number of such heteroatom substituents present. However, when polyanion substituents are included, e.g. dianion, trianion, etc., substituents, the total number of such substituents in the compound will be less than $y$.

Nonlimiting examples of alkali metal salts of complex anions containing heteroatom substituents used in the electrolytes of the cells of the present invention include:
$LiB(C_2H_5)_3[N(CH_3)_2]$,
$NaAl(C_2H_5)_3[N(CH_3)_2]$,
$LiB(C_6H_5)(C_6H_{11})_2[N(C_3H_7)(C_6H_5)]$,
$LiB(C_5H_9)_3[P(CH_3)(C_{20}H_{41})]$,
$LiB(CH_3)(C_{10}H_{21})(C_6H_5)[As(CH_3)(C_6H_5)]$,
$LiB(C_2H_5)_2[N(CH_3)_2]_2$,
$NaAs(C_6H_5)_2[N(C_2H_5)_2]_2$,
$LiB(C_3H_7)[N(C_2H_5)_2]_3$,
$NaAl[N(CH_3)_2]_4$,
$NaB(CH_3)_2[N(CH_3)_2]_2$,
$LiAl(C_2H_5)_3[N(CH_3)_2]$,
$LiAl(C_6H_5)[N(CH_3)_2]_3$,
$LiGa(C_2H_5)_3[N(CH_3)_2]$,
$LiAl(CH_3)_3[P(C_2H_5)_2]$,
$LiGa(C_6H_5)(CH_3)(C_{12}H_{25})[As(C_6H_{11})_2]$,
$LiP(CH_3)_4[N(CH_3)_2]_2$,
$LiAs(CH_3)_5[N(CH_3)_2]$,
$LiB(C_2H_5)_3[Si(CH_3)_3]$,
$NaB(C_2H_5)_3[Si(CH_3)_3]$,
$LiB(C_2H_5)_3[Ge(CH_3)_3]$,
$NaB(C_2H_5)_3[Ge(C_2H_5)_3]$,
$LiB(C_2H_5)_3[Sn(CH_3)_3]$,
$NaAl(C_6H_5)_3[Sn(CH_3)_3]$,
$LiB(CH_3)_2(C_{10}H_7)[N(CH_3)_2]$,
$NaAs(CH_3)_5[N(CH_3)_2]$,
$LiB(C_4H_9)_3[N(CH_3)_2]$,

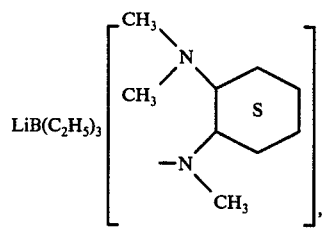

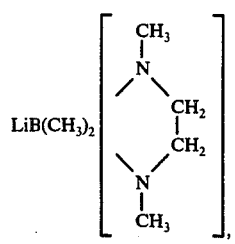

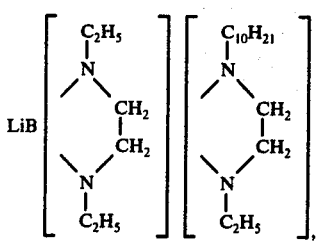

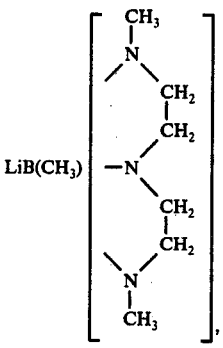

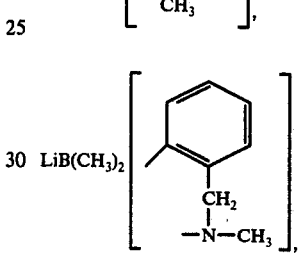

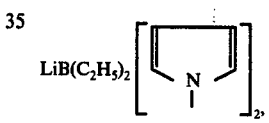

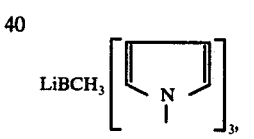

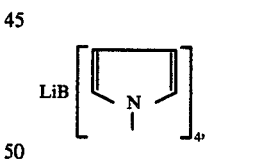

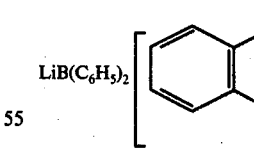

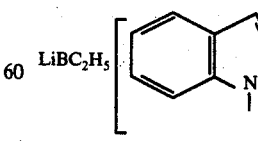

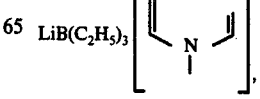

-continued

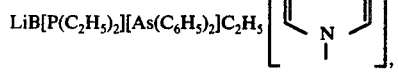

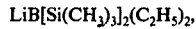

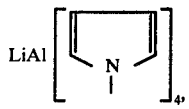

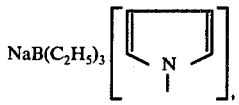

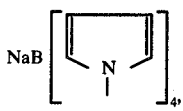

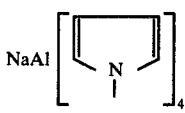

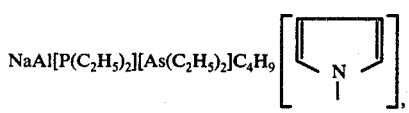

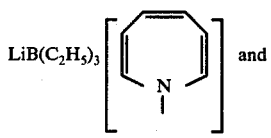

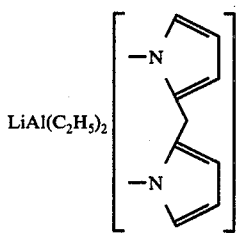

The salts used in the electrolytes of the cells of the present invention may be prepared by one of a number of techniques. Those compounds containing at least one monovalent heteroatom substituent may be prepared by reacting an alkali metal monovalent heteroatom substituent compound with the metallic or metalloid compound which corresponds to the ultimate present invention compound desired. This reaction may be represented by the following equation:

$$ZQ + MR_xQ_{y-1} \rightarrow ZMR_xQ_y \qquad (A)$$

wherein ZQ is an alkali metal monovalent heteroatom substituent compound and all other variables as described above.

Those salts used in the present invention which contain at least one organic radical substituent R may be prepared by reacting an alkali metal organo compound with the metallic or metalloid compound which corresponds to the ultimate present invention compound which is desired. This particular reaction may be represented by the following equation:

$$ZR + MR_{x-1}Q_y \rightarrow ZMR_xQ_y \qquad (B)$$

wherein all of the variables are as defined above.

The salts used in the electrolytes of the cells of the present invention which may be prepared by the technique such as that illustrated in Equation (A) above may alternatively be prepared by using an alkali metal hydride or alkali metal amide in place of the alkali metal salt ZQ according to the following equations:

 (C)

$$ZMR_xQ_y$$

and

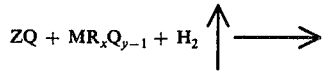 (D)

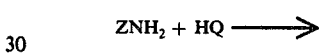

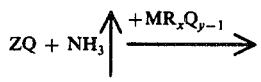

$$ZMR_xQ_{y-1}$$

wherein the variables are as defined above. In fact, for the sodium compounds, the method represented by the reactions set forth in Equation (C) is preferred.

Salts used in the present invention containing both organic radical substituents and monovalent (monoanionic) heteroatom substituents may be prepared by any of the above techniques.

Salts used in the present invention containing neither organic substituent R nor monovalent heteroatom substituent Q, i.e. compounds of the present invention containing only polyanion heteroatom substituents, may be prepared by nucleophilic substitution on the metal or metalloid M. For example, the following reactions are typical:

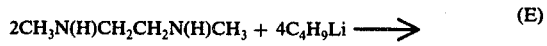 (E)

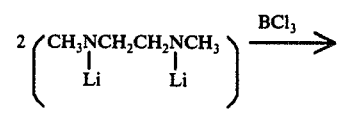

Similarly:

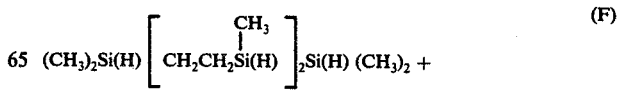 (F)

-continued

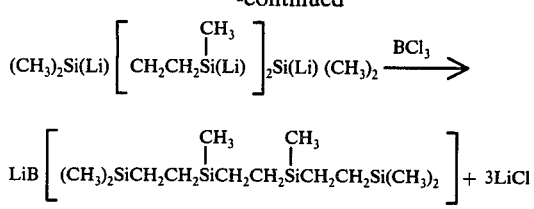

$$LiB\left[(CH_3)_2SiCH_2CH_2\underset{CH_3}{\underset{|}{Si}}CH_2CH_2\underset{CH_3}{\underset{|}{Si}}CH_2CH_2Si(CH_3)_2\right] + 3LiCl$$

The above reactions may be carried out at any operable pressure and temperature, and room temperature and pressure conditions will allow the reaction to readily occur in most instances. Desirably, the reactions are carried out at about $-100°$ to about $150°$ C, and preferably about $-20°$ to about $80°$ C, e.g. room temperature. In general, any compatible organic solvent may be used as a vehicle for the above reactions. Typical among these are hydrocarbons such as pentane, heptane, benzene, toluene, etc., and ethers such as diethyl ether, tetrahydrofuran and dimethoxyethane and the like. Other compatible solvents may be within the purview of the artisan.

The cells of the present invention, as mentioned, contain electrolyte compositions containing the above compounds as represented by Formula (1). More specifically, the electrolyte compositions used in the present invention comprise organic solvent and electrolytically active alkali metal salts including an alkali metal heteroatom substituted complex anion salt of Formula (1) above. Thus, a mixture of salts is contemplated, at least one of which is a Formula (1) type. The other salt or salts in the mixture may be any electrolytically active alkali metal salt which is compatible with the Formula (1) type compound, e.g. LiBr, LiI and the like. Also contemplated is the electrolyte which contains only one or more salts of Formula (1). Thus, the expression "electrolytically active alkali metal salts including an alkali metal heteroatom substituted complex anion salt" should be construed to include: (1) mixtures of alkali metal heteroatom substituted complex anion salt(s) and other compatible alkali metal salt(s), and (2) one or more alkali metal heteroatom substituted complex anion salts without other salts. Preferred is the electrolyte containing the heteroatom substituted complex anion salt(s) without other salts.

The organic solvent employed in the electrolyte composition used in the cell of the present invention is generally one selected from the group consisting of inertly substituted and unsubstituted ethers, esters, sulfones, organic sulfites, organic sulfates, organic nitrites and organic nitro compounds. By "inertly substituted" solvent is meant one which contains substituents which have no detrimental effect on the electrolytic properties of the electrolyte composition in the context of its effectiveness in electrochemical cells. These solvents may be any of the foregoing which will function as either a diluent or as a complexing solvent with the organometallic alkali metal salt and which will, with the salt, produce an effective electrolyte. Thus, the solvents which are included are those composed of one or more compounds selected from straight chain ethers, polyethers, and cyclical ethers; including such ethers as the acetals, ketals, and ortho-esters; and organic esters, sulfones, organic nitro compounds and nitrites and organic sulfates and sulfites. Examples include propylene carbonate, tetrahydrofuran, dioxolane, furan, sulfolane, dimethyl sulfite, nitrobenzene, nitromethane and the like. The preferred solvents are the ethers. For example, dioxolane, dimethoxyethane, and mixtures of these are useful. Preferred is a solvent containing dioxolane.

In general, sufficient organic solvent must be utilized to effectively render the organometallic alkali metal salt electrolytically active (i.e., adequately conductive) when employed in an electrolytic cell. The solvent may be a mixture of compounds as suggested above, and may contain known electrolyte additives which are compatible with the solvent and the particular salt employed. As to the amount of salt to be employed in the organic solvent, this will vary tremendously with the specific solvent used, the salt chosen and the type of electrochemical cell performance which is desired. In any event, an electrolytically active amount of salt must be added to the solvent. Typically, at least about 0.01 molal of salt up to saturation may be used, e.g., about 0.01 to about 10 molal may be used and preferably about 0.5 to about 3 molal may be used.

The present invention, as mentioned, relates to improved, rechargeable, high energy density electrochemical cells. The cells include any containing alkali metal anodes and electrolytes as defined above. Particularly useful are those containing solid cathode-active materials, e.g. cathodes having transition metal chalcogenides. Also preferred are the secondary cells. Alkali metals used in the anodes are desirably lithium, sodium and potassium, and the transition metal chalcogenide cathode-active materials include those containing at least one member selected from the group consisting of molybdenum, titanium, zirconium, hafnium, niobium, tantalum and vanadium; and at least one chalcogen selected from oxygen, sulfur, selenium, and tellurium. The anode is advantageously made of lithium or lithium alloys because lithium has the lowest equivalent weight of the alkali metals and is the most electronegative, thereby providing the most energy per weight unit. Of the lamellar transition metal chalcogenides, preferred are the dichalcogenides, and the most preferred is titanium disulfide because it has a low equivalent weight, is electrically conductive and its constituents are readily available. The electrolyte composition, as mentioned, contains organic solvent and alkali metal salt(s) which is set forth above.

The following examples are presented as merely illustrative of the present invention, and the invention should not be construed to be limited thereto:

EXAMPLE 1

$LiB[N(CH_3)_2](C_2H_5)_3$ is prepared by slowly adding 5.33 g of $LiN(CH_3)_2$ in small portions to a solution of 9.8 g of $B(C_2H_5)_3$ in 200 ml of toluene over 45 min. with stirring while the temperature of the reaction mixture is maintained at less than $35°$ C. The mixture is then stirred at room temperature for one hour and filtered to remove 0.35 g of solids. The clear filtrate is next evaporated under vacuum, yielding 13.0g of white salt which by NMR analysis is $LiB[N(CH_3)_2](C_2H_5)_3$.

EXAMPLE 2

In order to test the electrolytic capability of the compound obtained in Example 1, the compound is dissolved in pure dioxolane at various concentrations and the resistivities of the solutions are measured using a Barnstead Model PM-70CB Conductivity Bridge and a Yellow Springs Instrument Co. Model YSI 3403 Cell having platinum electrodes and having a cell constant of 1.0. The results presented in Table I establish low resistivity at the various concentrations tested.

TABLE I

Resistivity of LiB(C$_2$H$_5$)$_3$[N(CH$_3$)$_2$]
In Dioxolane

| Concentration (molal) | Resistivity (ohm-cm) |
|---|---|
| 1.0 | 309 |
| 1.5 | 243 |
| 2.0 | 227 |
| 2.5 | 231 |
| 3.0 | 258 |

EXAMPLE 3

The testing of Example 1 compound is repeated using the method of Example 2, except that a 70/30 volumetric mixture of dioxolane-dimethoxyethane is employed as the solvent. The results are good as illustrated in Table II below:

TABLE II

Resistivity of LiB(C$_2$H$_5$)$_3$[N(CH$_3$)$_2$]
in Dioxolane-Dimethoxyethane (70/30, V/V)

| Concentration (molal) | Resistivity (ohm-cm) |
|---|---|
| 1.0 | 312 |
| 1.5 | 265 |
| 2.0 | 265 |
| 2.5 | 280 |
| 3.0 | 306 |

EXAMPLE 4

N-lithiopyrrole is prepared by the addition of n-butyl lithium to a solution of pyrrole in pentane at room temperature. The suspension is then filtered and the solid is washed with pentane and dried under a nitrogen flow to constant weight. Solutions of

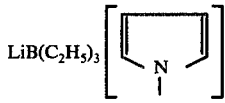

are prepared in pure dioxolane and 70/30 dioxolane-dimethoxyethane by adding solid N-lithiopyrrole to solutions of B(C$_2$H$_5$)$_3$ to make the 1:1 salt. $^1$H NMR analysis confirms the formation of the compound: C$_2$H$_5$ resonances: complex multiplet from δ0.6 to 1.5 centered at δ1.1; pyrrole resonances: triplet at δ6.4 J=1.8 and triplet at δ7.35 J=1.8. The triethyl boron resonances of the product salt are completely consistant with complex anion formation based on the NMR spectrum of a triethyl boron reference.

EXAMPLE 5

The compound of Example 4 is tested in accordance with the procedure of Example 2. Very low resistivity is achieved as Table III, below, illustrates.

TABLE III

Resistivity of LiB(C$_2$H$_5$)$_3$
In Dioxolane 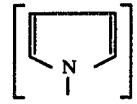

| Concentration (molal) | Resistivity (ohm-cm) |
|---|---|
| 1.0 | 140 |
| 1.5 | 134 |
| 2.0 | 156 |
| 2.5 | 204 |
| 3.0 | 296 |

EXAMPLE 6

The compound of Example 4 is tested in accordance with the procedure of Example 3. The resistivity is found to be very low as shown in Table IV:

TABLE IV

Resistivity of LiB(C$_2$H$_5$)$_3$
In Dioxolane-Dimethoxyethane (70/30, V/V) 

| Concentration (molal) | Resistivity (ohm-cm) |
|---|---|
| 1.0 | 92 |
| 1.5 | 95 |
| 2.0 | 116 |
| 2.5 | 153 |
| 3.0 | 229 |

EXAMPLE 7

N-lithioindole is prepared in accordance with the procedure of Example 4. Solutions of

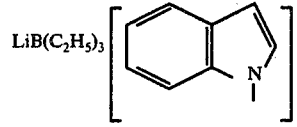

are prepared in pure dioxolane and 70/30 dioxolane-dimethoxyethane by adding solid N-lithioindole to solutions of B(C$_2$H$_5$)$_3$ to make the 1:1 salt. $^1$H NMR analysis confirms the formation of the compound based on reference spectra of the components.

EXAMPLE 8

The compound of Example 7 is tested in accordance with Example 2. Table V, below, records the data.

TABLE V

Conductivity of LiB(C$_2$H$_5$)$_3$
in Dioxolane 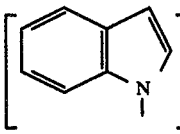

| Concentration (molal) | Resistivity (ohm-cm) |
|---|---|
| 0.5 | 220 |
| 1.0 | 155 |
| 1.5 | 168 |
| 2.0 | 216 |
| 2.5 | 403 |

EXAMPLE 9

The compound of Example 7 is tested in accordance with Example 3. The data are shown in Table VI.

TABLE VI

Conductivity of LiB($C_2H_5$)$_3$ in Dioxolane-Dimethoxyethane (70/30, V/V)

| Concentration (molal) | Resistivity (ohm-cm) |
|---|---|
| 0.24 | 255 |
| 0.5 | 166 |
| 1.0 | 124 |
| 1.5 | 134 |
| 2.0 | 177 |
| 2.5 | 286 |

EXAMPLE 10

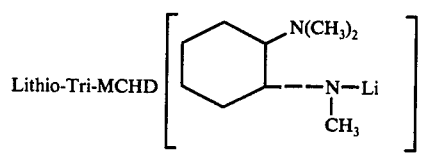

Lithio-Tri-MCHD is prepared from trans-N,N,N'-trimethylcyclohexanediamine in accordance with the procedure of Example 4. Solutions are prepared of

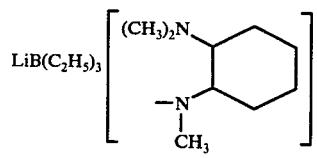

in pure dioxolane by adding solid lithio-Tri-MCHD to solutions of B($C_2H_5$)$_3$ to make the 1:1 salt. $^1$H NMR analysis confirms the formation of the salt based on reference spectra of the components.

EXAMPLE 11

The compound of Example 10 is tested in accordance with Example 2. The data are shown in Table VII.

TABLE VII

Conductivity of LiB($C_2H_5$)$_3$ in Dioxolane

| Concentration (molal) | Resistivity (ohm-cm) |
|---|---|
| 1.0 | 2520 |
| 1.5 | 2200 |
| 2.0 | 2240 |
| 2.5 | 2460 |
| 3.0 | 2840 |

EXAMPLE 12

The compound

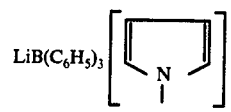

is prepared from B($C_6H_5$)$_3$ and N-lithiopyrrole using a 1:1 molar ratio in pure dioxolane and dioxolane-dimethoxyethane according to the procedure of Example 4. $^1$H NMR confirms the formation of the compound based on reference spectra of the components.

EXAMPLE 13

The compound of Example 12 is tested in accordance with Example 2. Table VIII shows the data.

TABLE VIII

Conductivity of LiB($C_6H_5$)$_3$ in Dioxolane

| Concentration (molal) | Resistivity (ohm-cm) |
|---|---|
| 0.56 | 278 |
| 1.0 | 254 |
| 1.29 | 290 |
| 1.5 | 340 |

EXAMPLE 14

The compound of Example 12 is tested in accordance with Example 3. Table IX shows the data.

TABLE IX

Conductivity of LiB($C_6H_5$)$_3$ in Dioxalane-Dimethoxyethane (70/30, V/V)

| Concentration (molal) | Resistivity (ohm-cm) |
|---|---|
| 0.5 | 247 |
| 1.0 | 216 |
| 1.5 | 283 |

EXAMPLE 15

A 1.56 g (22.9 mmoles) portion of imidazole is dissolved in 100 ml of tetrahydrofuran and the solution is cooled to −60° C and 10 ml (22.9 mmoles) of n-$C_4H_9$Li solution in hexane is added dropwise with stirring. The reaction mixture is then allowed to warm to room temperature over 75 minutes. The reaction mixture is then filtered through a fritted disk (ASTM 10-15) and a white solid lithium salt of imidazole (lithioimidazole-A) is isolated, dried weight 1.1 g.

The filtrate is evaporated to dryness under high vacuum and lithioimidazole-B is recovered, wt. 1.04 g.

That both products are lithium salts of imidazole is confirmed by $^1$H and $^{13}$C NMR analysis based on reference spectra as well as by hydrolysis of both products in $D_2O$ with the regeneration of imidazole as determined by NMR.

Solutions of LiB($C_2H_5$)$_3$]lithioimidazole-A] and LiB($C_2H_5$)$_3$[lithioimidazole-B] are prepared in dioxolane using 1:1 mole ratios of B($C_2H_5$)$_3$ and lithioimidazole-A and lithioimidazole-B respectively. NMR analysis confirms the formation of the compounds based on reference spectra of the components.

EXAMPLE 16

LiB(C$_2$H$_5$)$_3$[lithioimidazole-A] in dioxolane is tested in accordance with Example 2. Table X records the data.

TABLE X

Conductivity of LiB(C$_2$H$_5$)$_3$[lithioimidazole-A] in Dioxolane

| Concentration (molal) | Resistivity (ohm-cm) |
|---|---|
| 0.5 | 840 |
| 1.0 | 557 |
| 1.5 | 560 |
| 2.0 | 710 |

EXAMPLE 17

LiB(C$_2$H$_5$)$_3$[lithioimidazole-B] in dioxolane is tested in accordance with Example 2. Table XI records the data.

TABLE XI

Conductivity of LiB(C$_2$H$_5$)$_3$[lithioimidazole-B] in Dioxolane

| Concentration (molal) | Resistivity (ohm-cm) |
|---|---|
| 0.54 | 262 |
| 1.17 | 225 |
| 1.23 | 230 |

EXAMPLE 18

In an N$_2$ dry box, an excess of NaH in oil (6 g) is washed on a sintered glass funnel with 400 ml of pentane. The solid NaH is then transferred to an Erlenmeyer flask with 40 ml of dioxolane. A solution of triethylboron (19.6 g, 0.2 mole) in 30 ml of dioxolane is then added slowly with stirring. An exothermic reaction is observed. After this addition is complete, stirring is continued for 30 minutes at room temperature and the mixture is filtered. The residual NaH is washed with 15 ml of dioxolane and the washings are added to the filtrate. To the filtrate is then added, dropwise over 45 minutes, a solution of pyrrole (13.4 g, 0.2 mole) in 30 ml of dioxolane. Vigorous gas evolution is observed during the addition. After this addition is complete, stirring is continued for 1.5 hours. A sample of this solution is then analyzed by NMR. Comparison of the chemical shifts for the ethyl protons with a B(C$_2$H$_5$)$_3$ standard in dioxolane support formation of NaB(C$_2$H$_5$)$_3$(C$_4$H$_4$N). Integration shows the solute concentration to be 2.0 moles per liter of dioxolane. This solution and subsequent dilutions derived from it, are measured for their specific resistivities: molal (ohm cm): 2.0 (210), 1.5 (204), 1.0 (230), and 0.75 (267).

EXAMPLE 19

The following general method of construction is used to prepare cells containing the above-type electrolytes in accordance with the present invention:

The test cells contain a lithium or sodium anode prepared by pressing alkali metal ribbon onto expanded tantalum screen. The cathode is a porous cake of a mixture of TiS$_2$ and Teflon (90–95% TiS$_2$ and 5–10% Teflon) pressed onto an expanded tantalum screen. The anode and cathode are fitted into microporous polypropylene bags sold under the name Celgard by Celanese Corporation of America, New York. A glass mat is placed between the anode and cathode. Each cell also contains a reference alkali metal electrode constructed by pressing the appropriate alkali metal onto expanded tantalum screen. The reference electrode is fitted into a microporous polypropylene bag and separated from the adjacent cathode by means of a glass mat. In the completed cell the reference electrode is located on one side of the cathode while the anode is located on the opposite side.

Into one such cell containing a lithium anode and a TiS$_2$ cathode containing a weight of active material so as to provide 96.7 mA Hr. of theoretical capacity, is placed the electrolyte of Example 4 containing 2.0 moles of

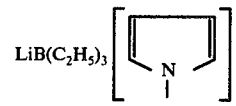

per liter of dioxolane. This cell is discharged at a current of 64 mA to afford utilization of 87 mAHr capacity at the end of the first discharge. The cell is then recharged at 16 mA.

The discharge cycle is then repeated. After 10 discharge/charge cycles the accumulated capacity drawn from the cell is 822 mA Hr. This demonstrates the rechargeable character of the battery, and the ability of the novel solute composition to function as a non-aqueous electrolyte in dioxolane.

EXAMPLE 20

Lithium aluminum hydride (1.14 g, 30 mmole) is suspended in 30 ml of dioxolane under a dry N$_2$ atmosphere. Pyrrole (9 g, 134 mmole) is added dropwise and vigorous gas evolution is observed. After stirring one hour, the mixture is filtered. The specific resistivity of the filtrate is 178 ohm cm. The $^1$H NMR spectrum of this solution is consistant with a 0.95 molal concentration of

in dioxolane. The filtrate is stripped to give 19.9 g of crude crystalline product containing dioxolane. The product is washed with n-heptane and dried under high vacuum with heating affording a product weighing 12.5 g.

What is claimed is:

1. In an electrochemical cell which contains an alkali metal anode, a cathode and a non-aqueous electrolyte, the improvement comprising:
   using as said electrolyte one which includes:
   (a) an organic solvent selected from the group consisting of inertly substituted and unsubstituted ethers, sulfones, organic sulfates, organic sulfites, organic nitrites and organic nitro compounds; and,
   (b) electrolytically active alkali metal salts including alkali metal complex anion salts having the formula:

ZMR$_x$Q$_y$ wherein Z is an alkali metal;

wherein M is a metal selected from the group consisting of Zn, Cd, B, Al, Ga, Sn (stannous), In, Tl, P, and As;

wherein R represents x number of radicals which may be the same or different and are inertly substituted or unsubstituted organic radicals selected from the group consisting of alkyl radicals having 1 to 20 carbon atoms, aryl radicals having 6 to 18 carbon atoms, alkaryl and aralkyl radicals having 7 to 25 carbon atoms and naphthenic radicals having 3 to 10 carbon atoms, wherein Q represents heteroatom substituents selected from the group consisting of:

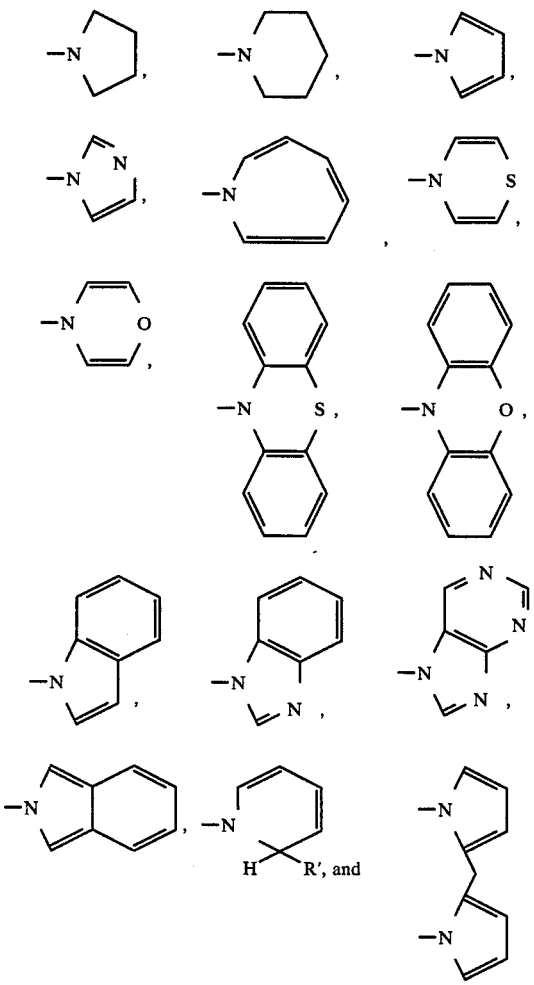

and any dimeric or trimeric composite of the foregoing radicals, and any group composed of two or three of the above structural units linked directly or through additional carbon (methylene);

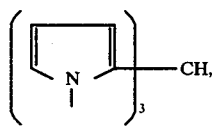

—NR′R′,    —PR′R′,    —AsR′R′,    —SiR′R′R′,
—GeR′R′R′, —SnR′R′R′, chelating dianions of the formulas R′NR″NR′, R′PR″PR′, R′AsR″AsR′, R′R′SiR″SiR′R′, R′R′GeR″GeR′R′, and R′R′SnR″SnR′R′, chelating trianions of the formulas R′NR″NR″NR′, R′PR″PR″PR′, R′AsR″AsR″AsR′, R′R′SiR″Si(R′)R″SiR′R′, R′R′GeR″Ge(R′)R″GeR′R′, and R′R′SnR″Sn(R′)R″SnR′R′, and the chelating tetraanions, the chelating pentaanions and the chelating hexaanions corresponding to the foregoing N, P, As, Si, Ge and Sn trianion formulas, wherein each of the R's are the same or different and are selected from the group consisting of unsubstituted and inertly substituted organic radicals consisting of alkyl radicals having 1 to 20 carbon atoms, aryl radicals having 6 to 18 carbon atoms, aralkyl and alkaryl radicals having 7 to 25 carbon atoms and naphthenic radicals having 3 to 10 carbon atoms, and wherein each of the R″s are the same or different and are selected from the group consisting of (1) hexa- and penta-cycloaliphatic and aromatic radicals and their lower alkyl derivatives wherein said radicals are attached in the above Q heteroatom substituents at 1,2- or 1,3- positions on the cycloaliphatic rings and at the 1,2-positions on the aromatic rings, and (2) 2 and 3 methylenic radicals, wherein each methylenic radical contains 0 to 2, monovalent hydrocarbon radicals of 1 to 6 carbon atoms;

wherein $x$ is zero or a positive integer; and wherein $y$ is a positive integer;

subject to the proviso that the sum of $x$ plus $y$ is equal to one plus the valence of the metal M, that $x$ is equal to the number of R radicals present and that $y$ equals the total valence of all Q radicals present.

2. The cell of claim 1 wherein the cathode comprises a solid cathode-active material.

3. The cell of claim 1 wherein the electrolyte composition organic solvent is one or more ethers.

4. The cell of claim 1 wherein said metal M is selected from the group consisting of B, Al, P and As.

5. The cell of claim 4 wherein said alkali metal Z is selected from the group consisting of lithium and sodium.

6. The cell of claim 5 wherein the organic radicals R are selected from the group consisting of alkyl radicals having 1 to 6 carbon atoms and aryl radicals having 6 to 10 carbon atoms.

7. The cell of claim 6 wherein the R′ radicals are selected from the group consisting of alkyl radicals having 1 to 6 carbon atoms and aryl radicals having 6 to 10 carbon atoms.

8. The cell of claim 7 wherein said alkali metal Z is lithium.

9. The cell of claim 8 wherein said metal M is boron.

10. The cell of claim 9 wherein the organic radicals R are selected from the group consisting of methyl and ethyl.

11. The cell of claim 10 wherein the R' radicals are selected from the group consisting of methyl and ethyl.

12. The cell of claim 11 wherein the electrolyte composition solvent contains dioxolane.

13. The cell of claim 12 wherein the electrolyte composition concentration of the alkali metal salt in said solvent is about 0.01 to about 10 molal.

14. The cell of claim 13 wherein the electrolyte composition concentration of the alkali metal salt in said solvent is about 0.5 to about 3 molal.

15. The cell of claim 1 wherein said alkali metal anode is selected from the group consisting of lithium anodes and sodium anodes.

16. The cell of claim 15 wherein said alkali metal anode is a lithium anode.

17. The cell of claim 1 wherein said heteroatom substituents represented by Q are selected from the group consisting of:

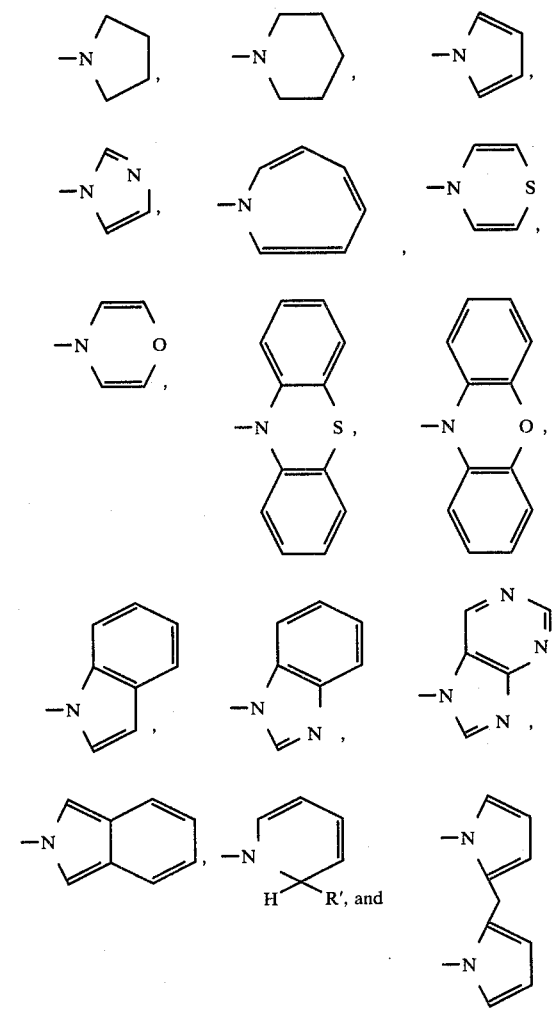

and any dimeric or trimeric composite of the foregoing radicals, and any group composed of two or three of the above structural units linked directly or through additional carbon (methylene);

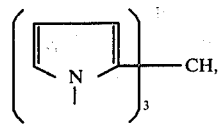

and wherein R' is selected from the group consisting of unsubstituted and inertly substituted organic radicals consisting of alkyl radicals having 1 to 20 carbon atoms, aryl radicals having 6 to 18 carbon atoms, aralkyl and alkaryl radicals having 7 to 25 carbon atoms and naphthenic radicals having 3 to 10 carbon atoms.

18. The cell of claim 17 wherein the electrolyte composition organic solvent is one or more ethers.

19. The cell of claim 17 wherein said metal M is selected from the group consisting of B, Al, P and As.

20. The cell of claim 19 wherein said alkali metal Z is selected from the group consisting of lithium and sodium.

21. The cell of claim 20 wherein the organic radicals R are selected from the group consisting of alkyl radicals having 1 to 6 carbon atoms and aryl radicals having 6 to 10 carbon atoms.

22. The cell of claim 21 wherein the R' radicals are selected from the group consisting of alkyl radicals having 1 to 6 carbon atoms and aryl radicals having 6 to 10 carbon atoms.

23. The cell of claim 22 wherein said alkali metal Z is lithium.

24. The cell of claim 23 wherein said metal M is boron.

25. The cell of claim 24 wherein the organic radicals R are selected from the group consisting of methyl and ethyl.

26. The cell of claim 25 wherein the R' radicals are selected from the group consisting of methyl and ethyl.

27. The cell of claim 26 wherein the electrolyte composition solvent contains dioxolane.

28. The cell of claim 27 wherein the electrolyte composition concentration of the alkali metal salt in said solvent is about 0.01 to about 10 molal.

29. The cell of claim 28 wherein the electrolyte composition concentration of the alkali metal salt in said solvent is about 0.5 to about 3 molal.

30. The cell of claim 17 wherein said alkali metal anode is selected from the group consisting of lithium anodes and sodium anodes.

31. The cell of claim 30 wherein said alkali metal anode is a lithium anode.

32. In an electrochemical cell which includes an anode having at least one alkali metal as its active material, a cathode having a lamellar transition metal chalcogenide as the cathode-active material and an electrolyte composition, the improvement comprising:
  using as said electrolyte one which includes:
  (a) an organic solvent selected from the group consisting of inertly substituted and unsubstituted ethers, sulfones, organic sulfates, organic sulfites, organic nitrites and organic nitro compounds; and
  (b) electrolytically active alkali metal salts including alkali metal complex anion salts having the formula:

$$ZMR_xQ_y$$

wherein Z is an alkali metal;

wherein M is a metal selected from the group consisting of Zn, Cd, B, Al, Ga, Sn (stannous), In, Tl, P and As;

wherein R represents $x$ number of radicals which may be the same or different and are inertly substituted or unsubstituted organic radicals selected from the group consisting of alkyl radicals having 1 to 20 carbon atoms, aryl radicals having 6 to 18 carbon atoms, alkaryl and aralkyl radicals having 7 to 25 carbon atoms and naphthenic radicals having 3 to 10 carbon atoms, wherein Q represents heteroatom substituents selected from the group consisting of:

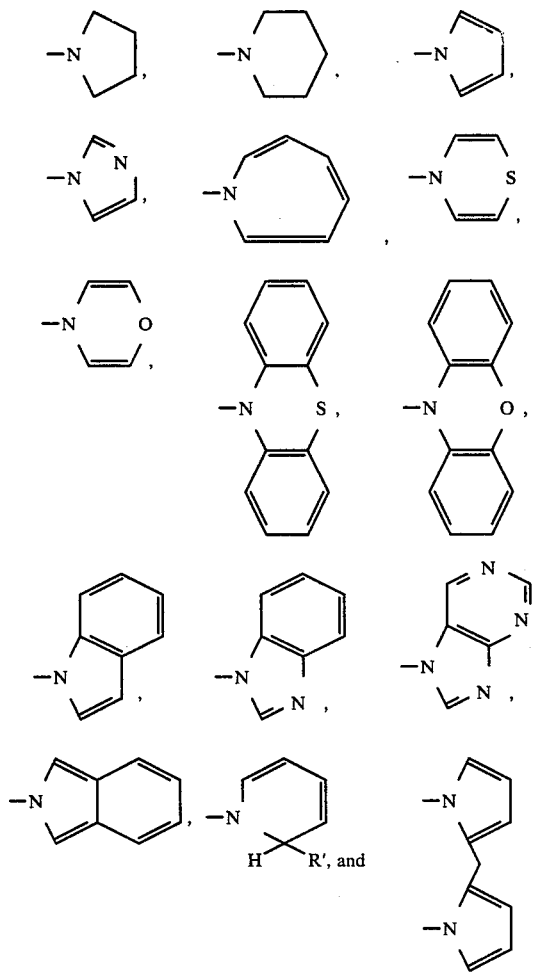

and any dimeric or trimeric composite of the foregoing radicals, and any group composed of two or three of the above structural units linked directly or through additional carbon (methylene);

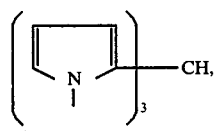

—NR'R', —PR'R', —AsR'R', —SiR'R'R', —GeR'R'R', —SnR'R'R', chelating dianions of the formulas R'NR"NR', R'PR"PR', R'AsR"AsR', R'R'SiR"SiR'R', R'R'GeR"GeR'R', and R'R'SnR"SnR'R', chelating trianions of the formulas R'NR"NR"NR', R'PR"PR"PR', R'AsR"AsR"AsR', R'R'SiR"Si(R')R"SiR'R', R'R'GeR"Ge(R')R"GeR'R', and R'R'SnR"Sn(R')R"SnR'R', and the chelating tetraanions, the chelating pentaanions and the chelating hexaanions corresponding to the foregoing N, P, As, Si, Ge and Sn trianion formulas, wherein each of the R's are the same or different and are selected from the group consisting of unsubstituted and inertly substituted organic radicals consisting of alkyl radicals having 1 to 20 carbon atoms, aryl radicals having 6 to 18 carbon atoms, aralkyl and alkaryl radicals having 7 to 25 carbon atoms and naphthenic radicals having 3 to 10 carbon atoms, and wherein each of the R"s are the same or different and are selected from the group consisting of (1) hexa- and penta-cycloaliphatic and aromatic radicals and their lower alkyl derivatives wherein said radicals are attached in the above Q heteroatom substituents at 1,2- or 1,3- positions on the cycloaliphatic rings and at the 1,2-positions on aromatic rings, and (2) 2 and 3 methylenic radicals, wherein each methylenic radical contains 0 to 2 monovalent hydrocarbon radicals of 1 to 6 carbon atoms;

wherein x is zero or a positive integer; and, wherein y is a positive integer;

subject to the proviso that the sum of $x$ plus $y$ is equal to one plus the valence of the metal M, that $x$ is equal to the number of R radicals present and that $y$ equals the total valence of all Q radicals present.

33. The cell of claim 32 wherein the electrolyte composition organic solvent is one or more ethers.

34. The cell of claim 33 wherein said metal M is selected from the group consisting of B, Al, P and As.

35. The cell of claim 34 wherein said alkali metal Z is selected from the group consisting of lithium and sodium.

36. The cell of claim 35 wherein the organic radicals R are selected from the group consisting of alkyl radicals having 1 to 6 carbon atoms and aryl radicals having 6 to 10 carbon atoms.

37. The cell of claim 36 wherein the R' radicals are selected from the group consisting of alkyl radicals having 1 to 6 carbon atoms and aryl radicals having 6 to 10 carbon atoms.

38. The cell of claim 37 wherein said alkali metal Z is lithium.

39. The cell of claim 38 wherein said metal M is boron.

40. The cell of claim 39 wherein the organic radicals R are selected from the group consisting of methyl and ethyl.

41. The cell of claim 40 wherein the R' radicals are selected from the group consisting of methyl and ethyl.

42. The cell of claim 41 wherein the electrolyte composition solvent contains dioxolane.

43. The cell of claim 42 wherein the electrolyte composition concentration of the alkali metal salt in said solvent is about 0.01 to about 10 molal.

44. The cell of claim 43 wherein the electrolyte composition concentration of the alkali metal salt in said solvent is about 0.5 to about 3 molal.

45. The cell of claim 44 wherein said heteroatom substituents represented by Q are selected from the group consisting of:

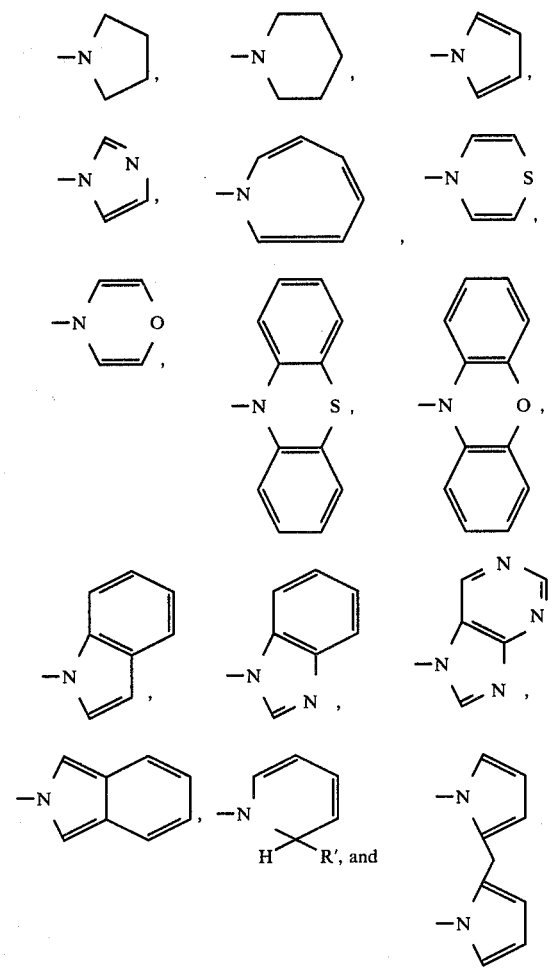

and any dimeric or trimeric composite of the foregoing radicals, and any group composed of two or three of the above structural units linked directly or through additional carbon (methylene);

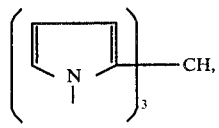

wherein R' is selected from the group consisting of unsubstituted and inertly substituted organic radicals consisting of alkyl radicals having 1 to 20 carbon atoms, aryl radicals having 6 to 18 carbon atoms, aralkyl and alkaryl radicals having 7 to 25 carbon atoms and naphthenic radicals having 3 to 10 carbon atoms.

46. The cell of claim 45 wherein the electrolyte composition organic solvent is one or more ethers.

47. The cell of claim 46 wherein said metal M is selected from the group consisting of B, Al, P and As.

48. The cell of claim 47 wherein said alkali metal Z is selected from the group consisting of lithium and sodium.

49. The cell of claim 48 wherein the organic radicals R are selected from the group consisting of alkyl radicals having 1 to 6 carbon atoms and aryl radicals having 6 to 10 carbon atoms.

50. The cell of claim 49 wherein the R' radicals are selected from the group consisting of alkyl radicals having 1 to 6 carbon atoms and aryl radicals having 6 to 10 carbon atoms.

51. The cell of claim 50 wherein said alkali metal Z is lithium.

52. The cell of claim 51 wherein said metal M is boron.

53. The cell of claim 52 wherein the organic radicals R are selected from the group consisting of methyl and ethyl.

54. The cell of claim 53 wherein the R' radicals are selected from the group consisting of methyl and ethyl.

55. The cell of claim 54 wherein the electrolyte composition solvent contains dioxolane.

56. The cell of claim 55 wherein the electrolyte composition concentration of the alkali metal salt in said solvent is about 0.01 to about 10 molal.

57. The cell of claim 56 wherein the electrolyte composition concentration of the alkali metal salt in said solvent is about 0.5 to about 3 molal.

58. The cell of claim 32 wherein the anode-active material is lithium or alloys thereof, and wherein the cathode-active material is titanium disulfide.

59. The cell of claim 58 wherein the alkali metal Z is lithium.

60. The cell of claim 59 wherein the metal M is boron.

61. The cell of claim 60 wherein said heteroatom substituents represented by Q are selected from the group consisting of:

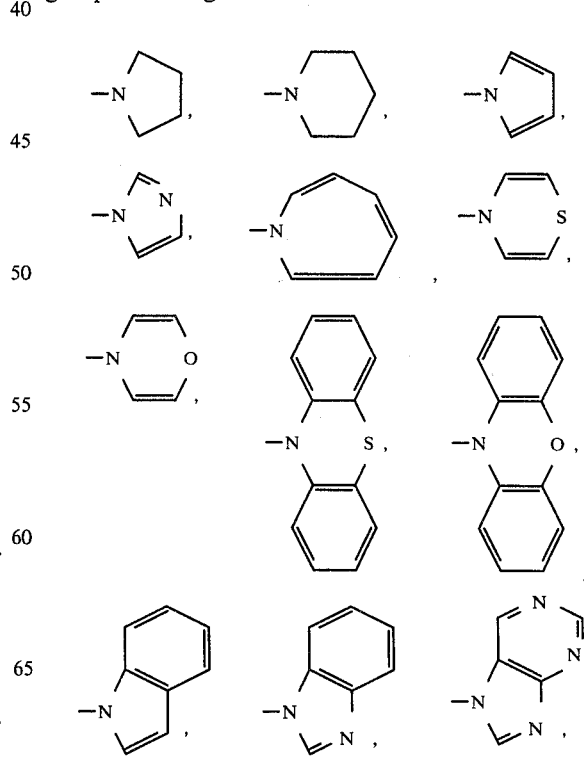

-continued

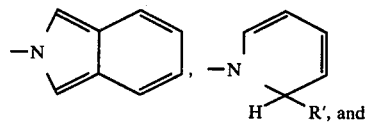

and any dimeric or trimeric composite of the foregoing radicals, and any group composed of two or three of the above structural units linked directly or through additional carbon (methylene);

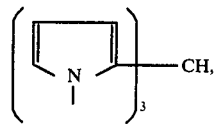

wherein R' is selected from the group consisting of unsubstituted and inertly substituted organic radicals consisting of alkyl radicals having 1 to 20 carbon atoms, aryl radicals having 6 to 18 carbon atoms, aralkyl and alkaryl radicals having 7 to 25 carbon atoms and naphthenic radicals having 3 to 10 carbon atoms.

62. The cell of claim 61 wherein the organic radicals R are selected from the group consisting of alkyl radicals having 1 to 6 carbon atoms and aryl radicals having 6 to 10 carbon atoms.

63. The cell of claim 62 wherein the R' radicals are selected from the group consisting of alkyl radicals having 1 to 6 carbon atoms and aryl radicals having 6 to 10 carbon atoms.

64. The cell of claim 63 wherein the electrolyte composition solvent contains dioxolane.

* * * * *